United States Patent [19]

Sluis et al.

[11] 4,219,837
[45] Aug. 26, 1980

[54] ALARMS BETWEEN STATIONS WITH RELATIVE MOTION

[75] Inventors: Mark H. Sluis, Pittsford; John H. Auer, Jr., Fairport, both of N.Y.

[73] Assignee: General Signal Corporation, Stamford, Conn.

[21] Appl. No.: 946,461

[22] Filed: Sep. 27, 1978

[51] Int. Cl.² ............................ G01S 3/80; H04B 1/00
[52] U.S. Cl. .................................... 367/128; 455/53; 340/554; 340/32
[58] Field of Search .................... 325/53, 58, 64, 55, 325/37; 246/167 D, 187 C; 343/6 R, 12 R, 14, 112 D, 112 CA; 340/32, 33, 554, 384 E; 367/124, 125, 128, 93, 94, 560, 16 R, 3 D, 3 FM

[56] References Cited

U.S. PATENT DOCUMENTS

| | | | |
|---|---|---|---|
| 3,273,145 | 9/1966 | Joy et al. | 343/6 R |
| 3,493,966 | 2/1970 | Human | 340/384 E |
| 3,893,121 | 7/1975 | Ringer | 325/37 |
| 4,013,994 | 3/1977 | Ragano et al. | 340/33 |
| 4,055,830 | 10/1977 | Wilson et al. | 343/112 D |
| 4,100,529 | 7/1978 | Evans | 340/32 |
| 4,117,405 | 9/1978 | Martinez | 325/58 |

*Primary Examiner*—John C. Martin
*Assistant Examiner*—Jin F. Ng
*Attorney, Agent, or Firm*—Milton E. Kleinman; George W. Killian; Harold S. Wynn

[57] ABSTRACT

An alarm or signalling system between a transmitter station and a receiver station either or both of which may be in motion. A signal is selectively radiated from the transmitter station for detection at the receiver station. The receiver station includes processing means for responding to the received signal and producing a new signal indicative of selected physical relationships between the transmitter and receiver stations during the period of signal transmission and reception. The modified signal may indicate approaching or departing relative motion and/or magnitude of separation. One embodiment may incorporate synchronizing signals transmitted from a central control station. This embodiment may include receiver stations with and without the synchronizing equipment.

10 Claims, 5 Drawing Figures

ALARMS BETWEEN STATIONS WITH RELATIVE MOTION

BACKGROUND OF THE INVENTION

The present invention relates to alarm, warning, or control system and, more particularly, to systems wherein information may be transmitted from one point to another under conditions wherein either or both of the points may be in motion and the action which should be taken at the receiving point may be a function of several factors including: the physical proximity of the two points; the magnitude and direction of the relative velocity between the two points; the character of the transmitted signal and other factors. For example, if the signal radiating source comprises a moving train and the signal receiver comprises equipment for operating grade crossing signals, it will be apparent that the direction of motion of the train relative to the grade crossing is important relative to the decision to provide signals to interrupt traffic at the grade crossing. That is, if the train is approaching the grade intersection, traffic should be interrupted; but if the train is receding from the grade intersection, traffic need not be interrupted. Similar techniques could be used in conjunction with ambulances and fire trucks, or other vehicles, to provide signals for controlling traffic lights at intersections as they are approached. There are numerous other situations wherein it would be desirable to provide signals of different character depending upon the changing physcial relationships between the transmitting and receiving stations. For example, the technique could be employed in a bus transportation system to help maintain uniform spacing between buses and to avoid bunching.

Other situations wherein it is desirable to transmit a signal from one location, receive it at another location and then produce a new signal indicative of selected physical relationships between the two locations will readily occur to those familiar with the physical characteristics and circumstances of their application.

In many applications, voice communication by radio provides very satisfactory results and information exchange. However, such techniques require human attendance, bulky and expensive equipment, and frequently a license for use. In addition, voice radio communication cannot provide information indicative of the relative motion between a moving transmitting station and a moving receiving station without lengthy conversational exchanges concerning their locations.

SUMMARY OF THE INVENTION

The invention provides for signalling from a transmitting station to a receiving station, either of which may have motion relative to the other. The signal receiving and processing means produces a modified output signal which is indicative of selected physical relationships existing between the respective stations during the period of signal transmission and reception.

Depending upon the combination of features desired, the transmitted signal may comprise: radio signals of various frequencies, inductive fields, ultrasonic signals, sonic signals or a combination thereof.

The relative motion between the stations may be sensed by making use of the Doppler effect wherein the signal is transmitted at a known frequency and, at the receiver, the received signal frequency is determined and, depending on the magnitude of the frequency shift, and appropriate signal is provided. Filters may be used to reject the signal if the Doppler shift causes the received signal frequency to fall outside a predetermined frequency band. Rate coded frequency modulation may be used.

In another embodiment, a system synchronization radio signal broadcast from a central location may be used. Such synchronization signal may comprise a frequency modulated signal that alternates between two specific frequencies, with predetermined time intervals for each. A sonic signal may be transmitted concurrently with a selected portion of the synchronized signal. The system synchronization signal is detected at the receiver station and the local alarm is sounded only when there is coincidence between the synchronization signal and the sonic signal. By this means the duration of the local alarm is indicative of the separation between the transmitting station and the receiving station.

It is an object of the present invention to provide a new and improved signalling system between a transmitter and a receiver.

It is a more specific object to provide a system of the character described wherein there may be relative motion between the transmitter and the receiver during the signalling.

It is another object of the invention to provide a system of the character described wherein the receiving station responds in first and second ways when the transmitting and receiving stations are approaching and separating, respectively.

It is another object of the invention to cause a receiving station to respond to a received signal in a manner to indicate the magnitude of the separation between the transmitting and receiving stations.

Other objects, advantages and features will become more apparent as the following description is considered in conjunction with the drawings in which:

FIG. 1 comprises a block diagram of first and second alternate receiver stations wherein the second receiver station incorporates most elements of the first receiver station;

FIG. 2 illustrates the timing of a central control signal which may be used in some systems;

FIG. 3 comprises a block diagram of a transmitter station;

DESCRIPTION OF THE PREFERRED EMBODIMENT

The principal system to be described herein in detail will be one using sonic signals. However, it should be understood that the signal emitted from the transmitting station may be of any appropriate form. For example, as previously set forth, some of the obvious possibilities include: radio signals of various frequencies; inductive fields and ultrasonic signals. The choice will be dependent upon a wide variety of factors including, but not limited to; costs, ambient signals of a similar nature, possible interference with other equipment, possible interference from other equipment, topography of the areas of use, cost of equipment, desired range, required sensitivity, sensitivity of equipment and/or other factors depending upon the desired features and characteristics.

Some advantages of the use of sonic signals are:

1. The sonic signal transmitter may also serve as a normal acoustic alarm, thereby eliminating a requirement for a separate siren. In fact, a standard siren may be used as the transmitter.

2. The signal amplitude decreases rapidly with distance from the transmitter. This characteristic should permit relatively good control of the effective range.

3. A sonic signal can travel around corners and into locations which might be shielded from electromagnetic signals.

4. The Doppler frequency shift of sonic signals permits an evaluation of the relative velocity between the transmitter and reciever; or in a more simple scheme, discrimination between approaching and departing relationships.

5. Since sonic signals have a low propagation velocity, the use of sonic signals permits the use of ranging schemes to determine separation between the transmitter and receiver stations.

6. An FCC license is not required as with some other types of signalling systems.

The use of sonic signals may, under certain circumstances, be deemed to have certain disadvantages such as:

1. The transmitting and receiving antennas may be more expensive than simple radio antennas.

2. The Doppler shift in frequency caused by relative motion between transmitter and receiver may require a receiver of broad band width, thereby increasing receiver responsivity to foreign signals and increasing the noise level.

3. An audible noise is created.

It will be apparent that the disadvantages may, under certain circumstances, be advantages.

Figure 1:
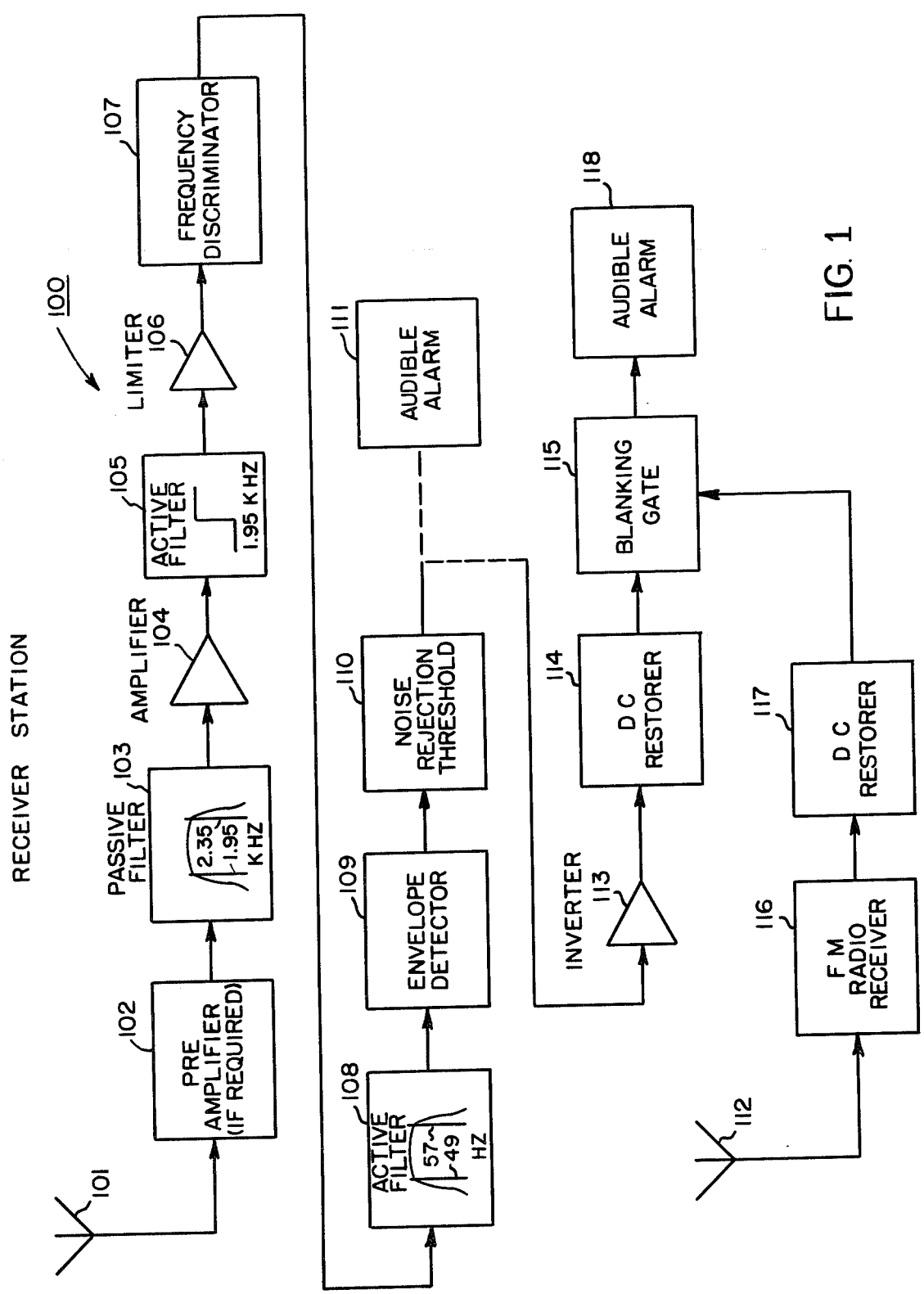

The sonic signal emitted from the transmitter station may have any of several different forms. One desirable characteristic of the transmitted signal would be that it include a unique signal characteristic which would permit improved discrimination with respect to background noise. A simple, convenient and effective technique, long used in railroad systems, is the use of rate code modulation. Another technique which provides good noise rejection features is frequency modulation. The representative system to be described herein will be described as using rate coded frequency modulation of the sonic signal. By way of illustration, the transmitted sonic signal may alternate between 2 kilohertz and 2.1 kilohertz, at a rate of 50 code cycles per second. In other words, the transmitted signal could comprise 20 cycles of a two kilohertz signal followed by 21 cycles of a 2.1 kilohertz signal, this combination taking 20 milliseconds of time and repeating 50 times per second. A receiver suitable for responding to transmitted signals of the type described is illustrated in FIG. 1 and designated generally as 100. The system may comprise one or more receiver stations 100.

As may be seen in FIG. 1, the receiver station 100 comprises an antenna 101 which, for the sonic system being described, may comprise a microphone. The antenna 101, or microphone, may be coupled to a preamplifier 102 if required in the system. Thereafter, the received signal is filtered by the passive filter 103 to filter out, or reject, frequencies outside the frequency band occupied by the transmitted signal. The passive filter 103 is shown with an upper cut off frequency of 2.35 kilohertz. This allows a Doppler shift of approximately 200 hertz without significant cut off of upper side bands. This corresponds to a closing speed of approximately 100 feet per second or 68 miles per hour. The passive filter 103 is illustrated with a lower cut off frequency of 1.95 kilohertz and thereby accepts the significant lower side band with no Doppler frequency shift when the relative speed between the transmitting station and the receiving station 100 is zero. If there is a velocity of separation between the transmitting and receiving stations, the signal frequency is shifted lower, by the Doppler effect, and the filter introduces attenuation. If the separating speed is sufficiently high, the entire signal is rejected. Following the passive filter 103 is an amplifier 104 which provides an input to an active filter 105 which is a sharp, high pass filter passing all signals above approximately 1.95 kilohertz. This provides further improvement of the directional characteristics of the system. It will be apparent that if it is desired to be able to respond to a separating velocity between the transmitting and receiver stations, as well as an approaching velocity, the high pass filter 105 could be eliminated and the band pass filter 103 would be centered on approximately 2.05 kilohertz. The rejection of extraneous noise at the receiver station 100 is improved by the limiter 106. The limiter 106 is followed by a frequency discriminator 107 which functions to extract the 50 hertz rate code signal. The demodulated signal from the frequency discriminator 107 is passed to an active filter 108 which rejects other frequencies and is designed to accommodate the Doppler shift resulting from relative motion between the transmitter and receiver stations as they approach each other. An envelope detector 109 produces a d.c. signal output which is proportional to the amplitude of the 50 hertz signal. The envelope detector 109 is followed by a noise threshold device 110 which provides an output signal in response to an input exceeding a predetermined level.

The output of the threshold device 110 may be directly coupled to an audible alarm 111 or coupled to optional circuits to be described more fully hereinbelow.

As previously described, the transmitting station may comprise a simple audio oscillator which is switched back and forth between two frequencies at, for example, a 50 hertz rate. The signal is amplified and broadcast through a loudspeaker which may have directivity. In a system wherein the transmitting station may comprise a vehicle such as: a police car, fire fighting equipment, an ambulance or other emergency vehicle, the broadcast audio alarm may also serve as a siren for advising and warning other traffic. The receiving station may comprise similar vehicles, command posts and/or automatic traffic signal controlling devices for sensing the approach of the emergency vehicle and to control traffic lights to provide free access for the emergency vehicle. A wide variety of applications and utility can also be envisioned in railroad and/or other transit systems.

The lower portion of FIG. 1, in conjunction with other figures, illustrates an alternate receiver station which includes station control from synchronizing radio signals which may be broadcast from a central location and which covers the entire region. In the illustrated example, the system synchronizing radio signal may comprise a frequency modulated signal which alternates between the two specific frequencies. By way of example, there will be illustrated a system wherein the lower of the two frequencies is transmitted for 3 seconds followed by a 1 second burst of the higher signal frequency. This provides a 4 second cycle which repeats. As suggested, the specific frequencies and periods recited for this radio synchronizing signal and the previously described audio signal are set forth as illustrative and to simply describing the system and do not constitute time or frequency requirements or limitations.

Figure 3:
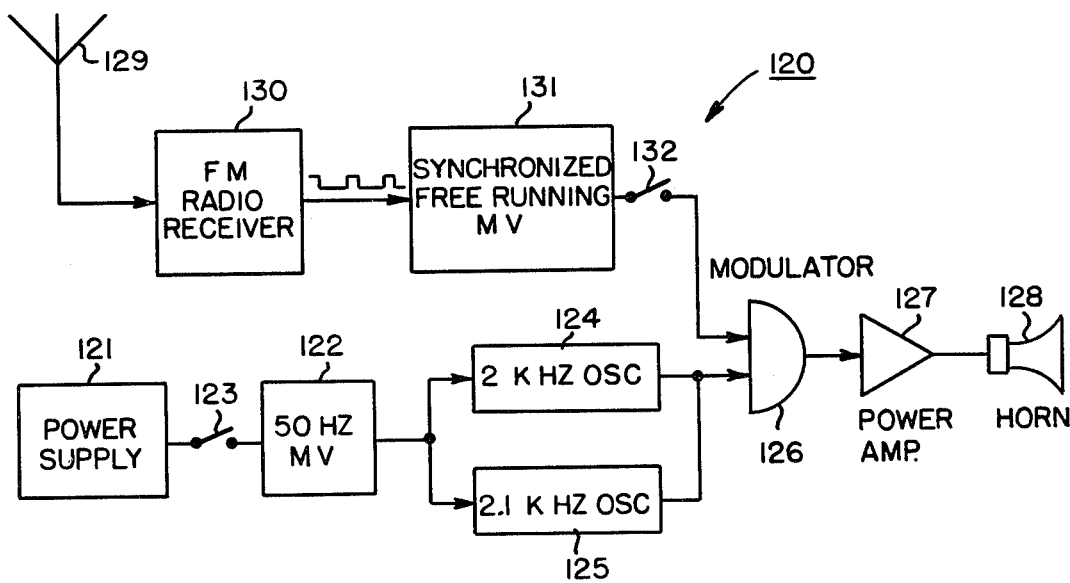

Considering now more specifically FIG. 3, there will be seen a transmitter station indicated generally as 120 which may broadcast a sonic alarm to be received by the antenna 101 which, as previously mentioned, may comprise a microphone. The transmitter station 120 may include a power supply 121 and a 50 hertz multivibrator 122 which is activated when the switch 123 is closed. The 50 hertz multivibrator 122 alternately turns off and on the 2 kilohertz oscillator and the 2.1 kilohertz oscillator designated 124 and 125, respectively. The output of the oscillator 124 or 125 is fed through modulator 126 which serves a function to be described more fully hereinafter, and the signal is applied to the power amplifier 127 which energizes the radiating horn 128. The sonic signal radiated from the horn 128 may be picked up by the antenna 101 at the receiver station 100 to cause activation of the audible alarm 111 in the manner previously described.

As suggested hereinabove, the system may also be modified by incorporating a central station control 140 which is most likely stationary, but which under selected conditions could be mobile. The central station control 140 will broadcast a frequency modulated control signal indicated more clearly in FIG. 2, wherein curves A and B illustrate that between time intervals T0 and T1 a low frequency signal is broadcast and between time intervals T1 and T2 a higher frequency signal is broadcast. The cycle repeats with the low frequency signal broadcast between time periods T2 and T3 and the high frequency signal between time periods T3 and T4. In the illustrated example, the low frequency signal is broadcast for a 3 second interval and the high frequency signal for a 1 second interval. The broadcast signal is a system synchronization radio signal and covers the entire region of operation. The synchronizing radio signal of FIG. 2 may be picked up by the antenna 112 at the receiver station 100 and by the antenna 129 at the transmitter station 120. At the transmitter station 120, the signal picked up by the antenna 129 is applied to an FM radio receiver 130 which locks a synchronized free running multivibrator 131 to the system time base. When it is desired to have the transmitter station 120 transmit a sonic signal from horn 128, which is controlled by the central station signal, the switches 123 and 132 will be closed and, therefore, the modulator 126 will modulate the signal previously passed therethrough so that the signal broadcast by the horn 128 comprises 3 second bursts of sound separated by 1 second quiet intervals.

Consideration will now be given to the receiver station 100 and more specifically the operation of the lower portion of FIG. 1 and the audible alarm 118 to be activated when the synchronizing signal from the central station is employed. As previously mentioned, the synchronizing signal from the central station will be picked up by the antenna 112. When this system is used, the signal output from the noise rejection threshold 110 will pass to the inverter 113 instead of the audible alarm 111 and thence through the d.c. restorer circuit 114 to the blanking gate 115 which will serve a function to be described more fully hereinbelow. The synchronizing signal received on the antenna 112 will pass through the FM radio receiver 116 and the d.c. restorer 117 to the blanking gate 115. The inverter 113 produces an output signal only when there is no sonic signal received by antenna 101 and the blanking gate 115 blocks the passage of any signal therethrough except when there is coincidence of signal from the d.c. restorers 114 and 117. When such coincidence occurs, and the inverter 113 produces an output, a signal is passed to the audible alarm 118. Thus the audible alarm 118 can be activated only during the one second portion of the system cycle between times T1 and T2 or T3 and T4 and then only if concurrently there is no sonic signal being received.

Because of the very rapid propagation of radio signals, it may be assumed, for all practical purposes, that the antennas 112 and 129 receive their synchronizing signals simultaneously irrespective of their respective distances from the central control station. As stated, the audible alarm 118 will be activated only during those portions of the 1 second phase of the system cycle during which the sonic signals is not received. Thus if the transmitter station 120 and the receiver station 100 have a zero separation therebetween, there will be no delay in the transmission of the sound and the audible sound transmitted from the horn 128 will be in phase with the signal applied to the inverter 113. That is, the sound will be broadcast from the horn 128 between intervals T0 and T1 and also between intervals T2 and T3. During the same time intervals, the receiving station 100 will receive the sonic signals. Accordingly, no sonic signal will be received at the receiver station 100 from time interval T1 to T2 and from time interval T3 to T4. Accordingly, since the alarm 118 is arranged to operate only during those portions of the 1 second phase of the system during which the sonic signal is not received, the audible alarm 118 will sound for the entire 1 second interval between times T1 and T2 and for the 1 second interval between times T3 and T4 when the receiver station 100 has a zero distance separation from the transmitter station 120. The times when sound is broadcast by the horn 128 at the transmitter station 120 is illustrated on line A of FIG. 4. The audible alarm reproduced at the receiver station 100 by the audible alarm 118 when there is a zero separation between the receiver station 100 and the transmitter station 120 is illustrated by line B of FIG. 4. As will be seen, the audible alarm 118 is activated for the 1 second portions of the system cycle between times T1 and T2 or T3 and T4 etc.

When there is a physical separation between the transmitter 120 and the receiver station 100, there will be a phase delay between the sound broadcast by the horn 128 and the detection of the sonic signal by the antenna 101. For example, if the sound is assumed to have a velocity of propagation of 1,100 feet per second and the separation between the transmitter station 120 and the receiver station 100 is 440 feet, it will be evident that the reception at the receiver station 100 is delayed by 0.04 seconds. This is illustrated at line C of FIG. 4. Thus as may be seen, the sonic signal is received from time T0' to time T1' and therefore is received during the first 4/10ths of a second of the time interval between time T1 and time T2, and from time interval T1' to time interval time T2 no audible signal is received at the receiver station 100. Accordingly, during that portion of the time interval between time T1 and T2 which constitutes the time interval from T1' to time T2 no audible signal is received and the audible alarm 118 is sounded. This is shown at line D of FIG. 4.

Figure 4:
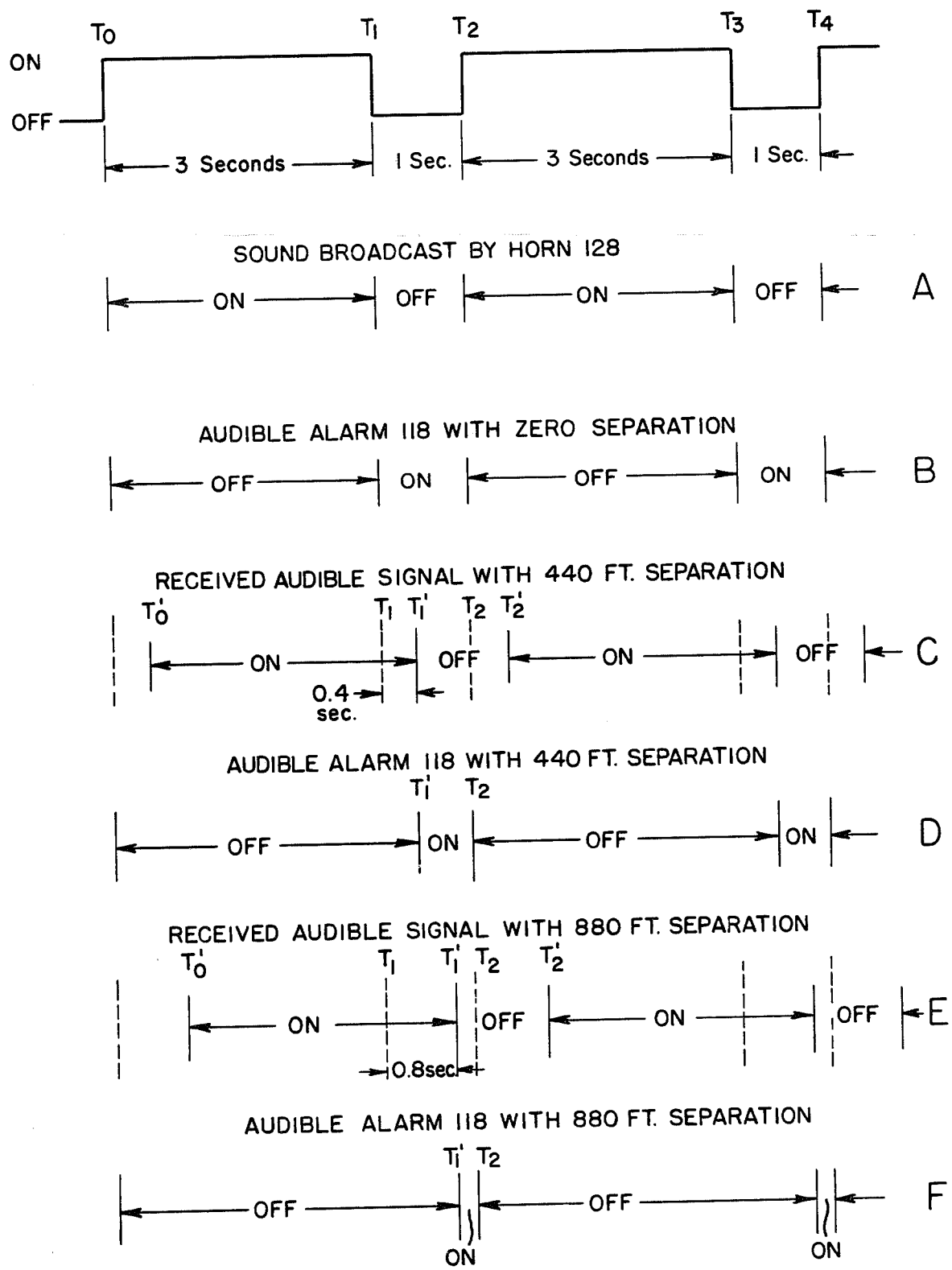
FIG. 4 illustrates relative timing of selected signals.

It will be apparent that the phase delay between the sound broadcast by the horn 128 and the detection of the sonic signal by the antenna 101 will be a function of the physical separation between the transmitter 120 and receiver 100. Lines E and F of FIG. 4 illustrate the action when the receiver station 100 and transmitting station 120 are separated by 880 feet which causes a phase delay of 8/10ths of a second, again assuming a velocity of sound propagation of 1,100 feet per second. At line E of FIG. 4, it will be seen that during the 1 second interval from time T1 to time T2. There is only a 2/10ths of a second period between times T1' and T2 wherein the sonic signal is not received and therefore only during this 2/10ths of a second between times T1' and T2 does the audible alarm 118 sound all as illustrated at line F.

It will be evident that when there is a separation of 1,100 feet or more between the transmitting station 120 and the receiver station 100, the audible alarm 118 at the receiver station will not be activated at all. That is, because of the separation between the stations there is a 1 second phase delay and there is no interval of time in the 1 second time slot during which the audible signal is not received by the antenna 101.

It will be apparent that if the transmitter station 120 and receiver station 100 are sufficiently far apart, the phase delay between the transmitted and received signals will be sufficient so that during the time interval T1 to T2, or a portion thereof, no signal will be received by the antenna 101 and the audible alarm 118 could be activated. However, at this distance which, in the illustrated example occurs beyond 3,300 feet, the transmitted sonic signal may be presumed to be sufficiently attenuated as to be imperceptible to the antenna 101. In summary, it will be seen that the actuation of the audible alarm 118 comprises ringing bursts, or pulses, occurring every 4 seconds and with a duration varying from perceptible to 1 second with the duration inversely proportional to the separation between the transmitting station and receiving station.

It will be obvious that if the time interval between times T1 and T2 is lengthened, that it will be possible to activate the audible alarm 118 at the receiver station 100 when the transmitting station 120 is more than 1,100 feet away. The width of the time window between times T1 and T2, for a particular application, will depend upon the application requirements and equipment sensitivity and possibly other factors.

It will also be apparent that it would be a relatively simple procedure to measure the time interval between time T1' and T2 and to convert the time interval to a value representing the distance separation between the transmitter station 120 and the receiver station 100.

When the range limited receiver technique employing the central station control signals is used, the audible alarm 118 sounds during the intervals of sonic signal absence. Accordingly, the d.c. restorer circuit 114 is provided in order to provide a control for the alarm device 118 during the 1 second intervals of absence of sonic signal and to prevent the continuous actuation of the audible alarm 118 in the complete absence of a sonic signal.

Figure 2:
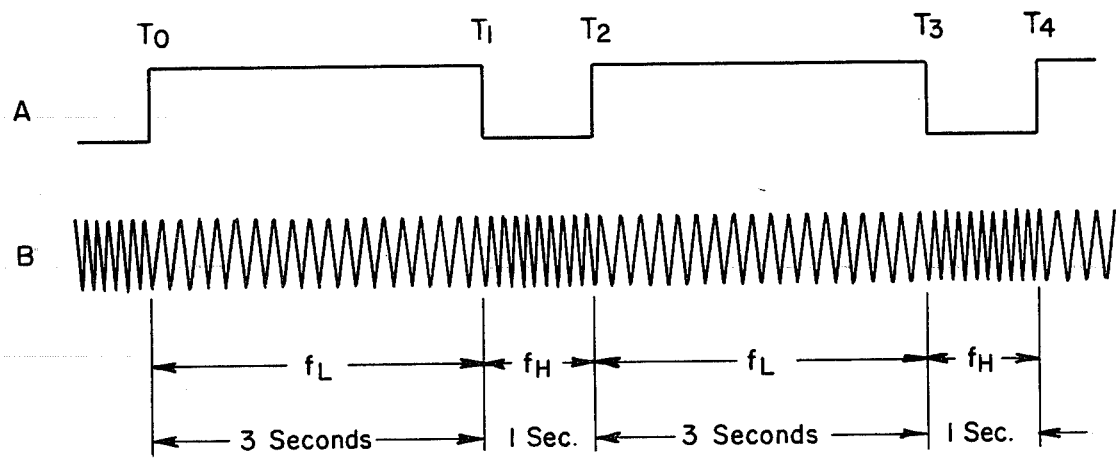
Figure 5:
FIG. 5 illustrates a Central Control Station.

The system as presented herein is designed to provide alarms even when the central radio transmitter broadcasting the signals illustrated in FIG. 2 is inoperative. This explains the use of the 50 hertz multivibrator 122 at the transmitter station 120 which will continue to operate in the absence of system synchronizing information received over antenna 129. The blanking gate 115 at the receiver station 100 is, in effect, a coincidence gate which blanks out the sonic information during the 3 second phase of the system cycle. In the absence of the system information, sonic information is not blanked and a full 1 second audible alarm is sounded by alarm device 118 once every 4 seconds irrespective of the separation between the transmitter station 120 and the receiver station 100 so long as the sonic signal is sufficiently strong to be detected by the antenna 101. Accordingly, if the central control radio transmitter fails, the system becomes most restrictive and the audible alarm 118 will be activated for 1 second each 4 second cycle indicating minimum separation between the transmitting station 120 and the receiving station 100.

As previously suggested, the techniques disclosed herein may be used in a wide variety of applications and situations. For example, the transmitter station 120 could be aboard an emergency vehicle and fixed receivers could be located at intersections and used for controlling intersection signals to provide an all red condition by the time the approaching emergency vehicle is a predetermined distance from the intersection in order to allow the emergency vehicle to pass with minimum probability of interfering traffic. Such intersection receivers could also control local signals such as pole mounted sirens.

In another application, stationary receivers could be located at railroad grade crossings and turned on by approaching trains. In this application, it would be possible to use some other form of emission such as, radio signals or an inductive field to avoid an unnecessary disturbance in the neighborhood.

The system could also be used in a public transportation system wherein each vehicle includes both a transmitter and a receiver for transmitting signals to, and receiving signals from, the preceding and following vehicles, respectively, whereby all vehicles are provided with information concerning the proximity of the nearest adjacent forward and following vehicle. With this information, each vehicle driver could adjust his average speed to maintain more uniform separation and thereby reduce long gaps between vehicles due to bunching. In this application, the alarm device 118 would probably constitute a lamp rather than an audible device. And the horn 128 would transmit signals outside the range of human hearing.

Note that the various schemes are not incompatible and that more than one may be used in any given area.

It should be observed that a system incorporating a central station transmitting a synchronizing signal fails in a fail-safe mode if the central station fails or if the corresponding part of the receiver station 100 fails. The receiver will respond as if there is zero separation between the receiver station 100 and the transmitter station 120. The transmitter station 120 will continue to transmit 1 second in each 4 second cycle; but without synchronization if the central station has failed. In a fully synchronized system, there could be receivers that do not incorporate elements 112 to 118 if signals indicative of separation are not required.

Other applications of the techniques disclosed will be limited only by the ingenuity of the systems engineer.

While there has been shown and described what is considered at the present to be a preferred embodiment of the invention, modifications thereto will readily occur to those skilled in the related arts. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A signalling system between a transmitter station and a receiver station either of which may have motion relative to the other and comprising in combination:
   (a) controlled means for selectively generating frequency modulated and rate coded sonic signal, and for transmitting said sonic signal alternatively at first and second frequencies at a fixed rate per unit time, from the transmitter station for transmission toward the receiver station; and
   (b) signal processing means at the receiver station including filter means for receiving and processing the received signal and rejecting signals below and above first and second fixed frequencies, respectively, and which, in turn, are below and above said first and second frequencies, respectively, and for producing a modified signal indicative of selected physical relationships existing between the transmitter and receiver stations during the period of signal transmission and reception.

2. The combination as set forth in claim 1, wherein said modified signal has a first characteristic when there is relative motion between the transmitter and receiver stations which results in reduced distance therebetween.

3. The combination as set forth in claim 2, wherein said modified signal has a second characteristic when there is relative motion between the transmitter and receiver stations which results in increased distance therebetween.

4. The combination as set forth in claim 1, wherein said modified signal has first and second characteristics when the transmitter and receiver stations are separated by first and second distances, respectively.

5. The combination as set forth in claim 1, wherein the difference between said first and second frequencies and that between said first fixed frequency and said first frequency are such that the frequency shift caused by a relative separating velocity, between the transmitter and receiver stations, exceeding a first fixed magnitude, results in the signal received at the receiver station being below said first fixed frequency.

6. The combination as set forth in claim 1, wherein the difference between said first and second frequencies and that between said second fixed frequency and said second frequency are such that the frequency shift caused by a relative approaching velocity, between the transmitter and receiver stations, exceeding a second fixed magnitude, results in the signal received at said receiver station being below said second fixed frequency.

7. A signalling system between a transmitting station and a receiving station either of which may have motion relative to the other and comprising in combination:
   (a) a central control station transmitting frequency modulated control signals, which alternate between first and second frequencies in a controlled cycle, from said central control station to both the transmitting station and the receiving station for synchronizing control;
   (b) control means at the transmitter station for selectively controlling the radiation of a first signal therefrom in response to receipt of said control signals from said central control station; and wherein
   (c) said first signal is propagated at a lesser velocity than said control signals;
   (d) signal processing means at the receiving station for comparing said control signals as received from said central control station and said first signal received from the transmitting station and for producing a modified signal, whose successive cycles are indicative of the separation between the transmitting station and the receiving station, in response to concurrent receipt of selected portions of said control signals and said first signals from said central control station and the transmitting station, respectively;
   (e) said signal processing means further including frequency shift responsive means for responding to a frequency shift of said control signals, as received at said receiving station, and which is a consequence of relative motion between said receiving station and said transmitting station; and wherein
   (f) said frequency shift responsive means controls production of said modified signals so that said modified signals are produced only in response to receipt of a predetermined one of said first and second frequencies concurrent with non-receipt of said first signal.

8. The combination as set forth in claim 7, wherein said modified signal has a first characteristic when there is relative motion between the transmitting and receiving stations which results in reduced distance therebetween.

9. The combination as set forth in claim 8, wherein said modified signal has a second characteristic when there is relative motion between the transmitting and receiving stations which results in increased distance therebetween.

10. The combination as set forth in claim 7, wherein said modified signal has first and second characteristics when the transmitting and receiving stations are separated by first and second distances, respectively.

* * * * *